(12) United States Patent
DeTreville (10) Patent No.: US 8,892,694 B2
(45) Date of Patent: Nov. 18, 2014

(54) DECLARATIVE SYSTEM CONFIGURATIONS

(75) Inventor: John D. DeTreville, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 2420 days.

(21) Appl. No.: 11/258,600

(22) Filed: Oct. 24, 2005

(65) Prior Publication Data

US 2007/0091819 A1    Apr. 26, 2007

(51) Int. Cl.
  *G06F 15/177*  (2006.01)
  *G06F 9/45*  (2006.01)
  *H04L 12/24*  (2006.01)
(52) U.S. Cl.
  CPC ........ *H04L 41/0869* (2013.01); *H04L 41/0803* (2013.01)
  USPC ............................................. 709/220; 703/22
(58) Field of Classification Search
  USPC ........................................... 709/220; 703/22
  See application file for complete search history.

(56) References Cited

U.S. PATENT DOCUMENTS 6,463,535 B1 * 10/2002 Drews ........................... 713/176
6,560,706 B1 * 5/2003 Carbajal et al. ............... 713/155
2004/0093593 A1 * 5/2004 Jhanwar et al. ............... 717/169
2005/0198629 A1 * 9/2005 Vishwanath .................. 717/174
2006/0037000 A1 * 2/2006 Speeter et al. ................ 717/120

OTHER PUBLICATIONS

Jaeger, How to dual-boot, Oct. 29, 2004, [online], retrieved from <web.archive.org/web/20041020073735/jaeger.morpheus.net/linux/ntldr.php>, pp. 1-3 as printed.*

* cited by examiner

*Primary Examiner* — Kambiz Zand
*Assistant Examiner* — Shu Chun Gao
(74) *Attorney, Agent, or Firm* — Cassandra Swain; Judy Yee; Micky Minhas (57) ABSTRACT

A declarative approach is used for system configuration. The declarative approach improves a system's integrity which makes the system more dependable. An overall system model is defined that describes the system as a whole. The models are hierarchical and can reference and incorporate any number of sub-models. The models within the system model are used to define the programs within the system. The system model is applied to a collection of system parameters that produces a statically typed, fully configured system instance. Each system instance may then be checked against established system policies that can express a variety of additional ad hoc rules defining which system instances are acceptable.

20 Claims, 6 Drawing Sheets

DECLARATIVE SYSTEM CONFIGURATIONS

BACKGROUND

Administering a computer can be difficult and painstaking work for even the most knowledgeable users. Even though the task of system administration is difficult, and is fraught with potential problems, it is typically left to individual users having limited knowledge of system administration. As a result, these computer systems are likely to be incorrectly configured, undependable, brittle, as well as insecure and result in productivity losses for the individual users as well as for businesses. It has been estimated that it costs employers $6,000 a year for each user who attempts to configure their computers. The time is typically spent installing and uninstalling programs, updates, and the like to their system. The computer system's correctness ultimately depends, therefore, on the correctness and the appropriateness of every install and uninstall that has ever been performed on the system. An incorrectly configured system results in an inefficient system that decreases performance, or a non-functional system that cannot perform the desired tasks, or an insecure system that might be open to an attacker.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A declarative approach for system configuration is used. The declarative approach can improve a system's integrity and make the system more dependable. An declarative overall system model is first defined to describe the system as a whole. The model is hierarchical and can reference and incorporate any number of sub-models. These sub-models within the system model are used to define the programs within the system; the system model then integrates these sub-models. The resulting system model is functionally applied to a collection of system parameters to produce a statically typed, fully configured system instance. Each system instance may then be further checked against established system policies that can express a variety of additional ad hoc rules defining which system instances are acceptable. Finally, the system instance is made available to one or more computers, and these computers are set to follow the new system instance as the current system instance.

DETAILED DESCRIPTION

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented.

Generally, program modules include routines, programs, components, data structures, and other types of structures that perform particular tasks or implement particular abstract data types. Other computer system embodiments may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
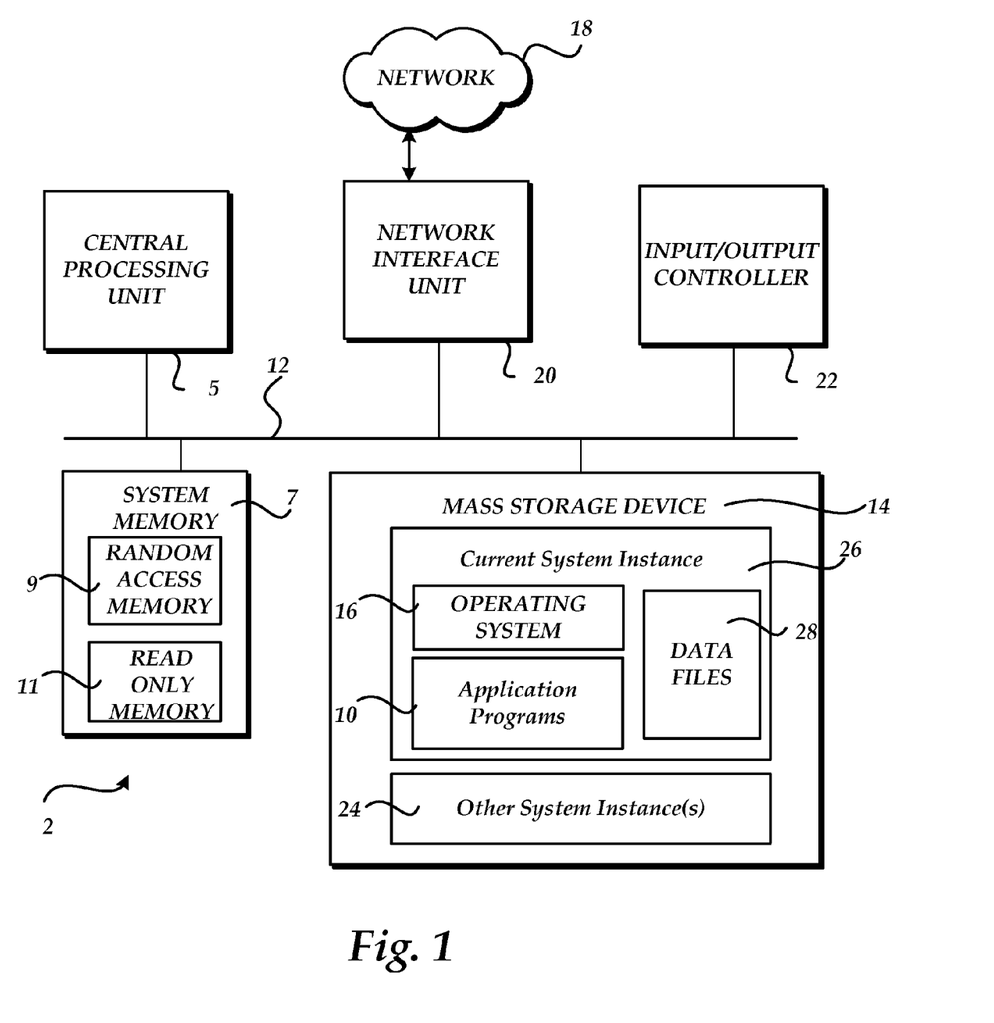
FIG. 1 illustrates an exemplary computing architecture for a computer.

Referring now to FIG. 1, an illustrative computer architecture for a computer 2 utilized in the various embodiments will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing a current system instance 26, including an operating system 16, application programs, and other program modules and data files 28, which will be described in greater detail below. Other system instances 24 may also be stored on the mass storage device 14.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, the computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2. The current system instance 26 and the other system instances 24 may be stored on any such computer-readable media.

According to various embodiments of the invention, the computer 2 may operate in a networked environment using logical connections to remote computers through a network 18, such as the Internet. The computer 2 may connect to the network 18 through a network interface unit 20 connected to the bus 12. The network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device. The system instance may be stored on or shared among any computers or computable-readable media accessible on the networked environment.

As mentioned briefly above, a number of program modules and data files may be stored in the mass storage device 14 and RAM 9 of the computer 2, including an operating system 16 suitable for controlling the operation of a networked personal computer. The mass storage device 14 and RAM 9 may also store one or more program modules. In particular, the mass storage device 14 and the RAM 9 may store application programs 10. Each of the application programs 10 is contained within a system model such that the computer system is completely described as components of the system model. A current system instance 26 is thus a fully configured system that can on computer 2. Other system instances (24) that may not be current may also be stored in mass storage device 14. According to one embodiment, only one system instance is current and executes at a time. Additional details regarding the system instances (24 and 26) will be provided below.

Figure 2:
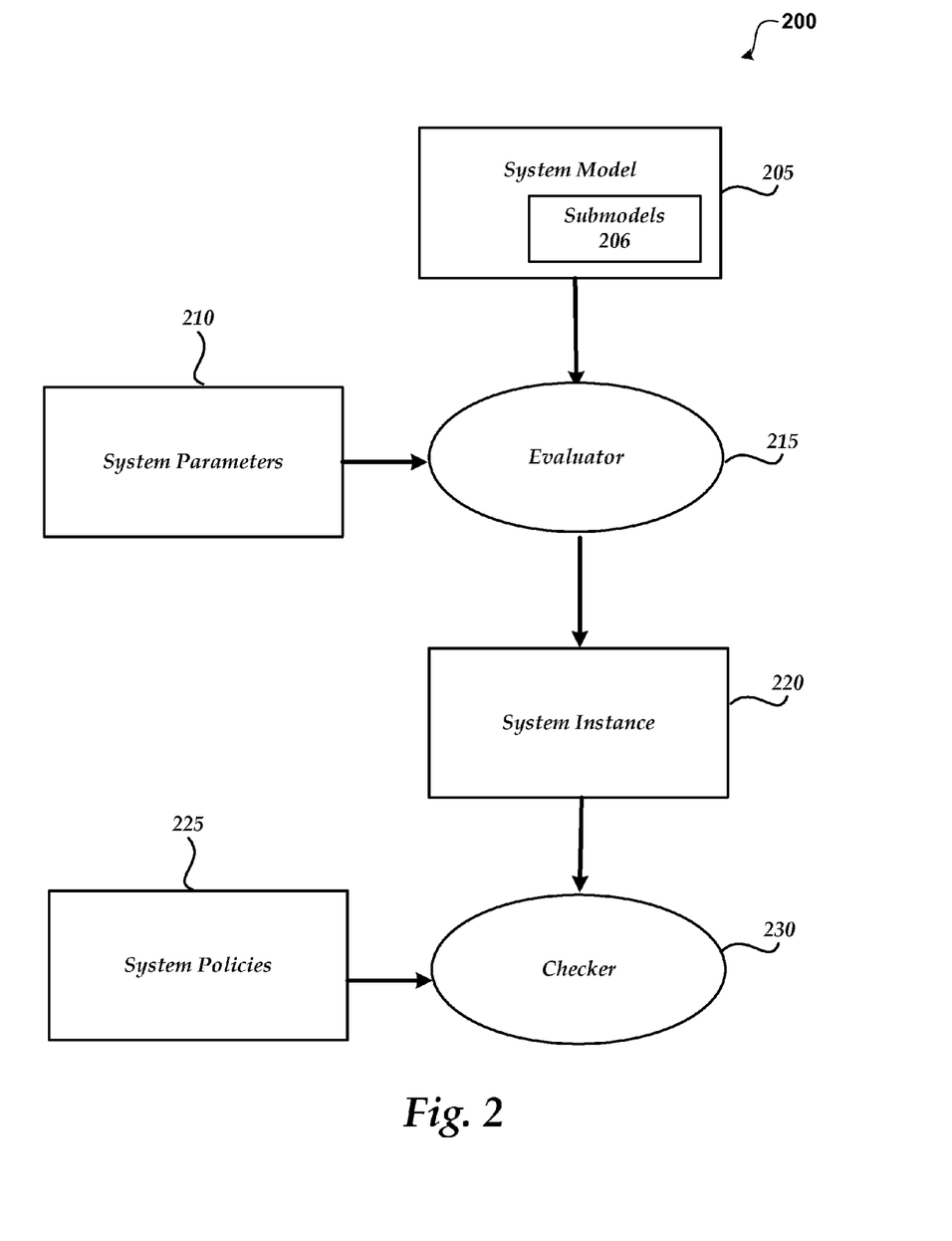
FIG. 2 illustrates a declarative system configuration system.

FIG. 2 illustrates a declarative system configuration system 200, for producing and checking system instances in accordance with aspects of the invention. As illustrated, configuration system 200 includes system model 205, system parameters 210, evaluator 215, system instance 220, system policies 225 and checker 230.

As described briefly above, the declarative system model 205 completely, precisely, and specifically defines a system. The hierarchical system model 205 references and incorporates any number of sub-models 206. Sub-models 206 may further reference any number of further sub-models, and so on. Generally, the system model includes declarations to reference each program that is contained and/or that is utilized within the system, as well as the ways in which they are interconnected and interoperate. As used herein, "program" refers to any item within the system that is configured to perform some operation within the system. A program may be implemented in hardware and/or in software or some combination of hardware and software. Programs include, but are not limited to software programs, device drivers, function libraries, such as dynamic link libraries, hardware devices, and the like. A variety of users may define and create the sub-models that are contained within the system model. For example, programmers, publishers, and remote administrators can write these submodels, while a local administrator may compose them into the system model (See FIG. 3 for an example system model).

Evaluator 215 evaluates the system model 205 as applied to the system parameters 210 and produces a complete, fully configured system instance 220. Evaluating a system model has no side effects to the current system, and applying the same system model to the same system parameters always produces the same system instance. A system instance 220 may be created from a new model, an updated model, or from an old model with updated system parameters. The system instance 220 is produced functionally and not as a local update to the current system instance. The functional nature of the model evaluation is convenient for system administrators, especially for the administrators of distributed systems. For example, the model evaluation allows system instances to be created on systems other than the systems on which they will run, or to be created on multiple systems while resulting in the same system instances.

Each system instance 220 may be checked by checker 230 against system policies 225 to determine which system instances are valid based upon established system policies 225.

System policies 225 are configured to express a variety of ad hoc rules that may be used to constrain the acceptable structure of a system instance. System policies add additional checks to the checks inherent in the structure of system models and their evaluation. The ad hoc rules making up the system policies are particularly helpful since properties associated with programs contained within the system model are often not discovered until after they are deployed. For example, it may be determined that program 1 works with program 2 but program 2 does not work when program 1 and program 3 are running. With prior art systems, these ad hoc rules can cause difficulty in configuring systems since a user is required to know and remember all of the rules, and to stay current on the rules.

Some system policies may be expressed using type rules and checked by the evaluator 215, or by the checker 230. For example, suppose that program ONE requires a kernel that supports UTF-8 encoding. According to one embodiment, this requirement may be encoded as a type rule by indicating that its kernel must belong to the Utf8Support type class. Although not illustrated within the following example, program ONE may have other requirements that have to be met. The following example shows an example ad hoc rule:

data ONE=forall k·Utf8Support k=>ONE k

In this example, the variable k represexnts the kernel that program ONE is to work with in the resulting system instance. The program ONE can be configured as a function of k only if k belongs to the Utf8Support type class. Each known kernel type may then be listed as belonging or not belonging to the Utf8Support type class. When new determinations are made, perhaps because a new kernel is published, or perhaps an old kernel is found to support or not to support UTF-8, new definitions may be imported and acted upon. After these policies are created they may be checked by checker 230. These policies can be created and updated long after the programs and kernels have been created.

Many other types of system policies may be created. For example, there may be a system policy that the system instance must fit in less than one megabyte of RAM. In this example, the checker may inspect the system instance and check it against the rule.

Another example ad hoc policy might be that the system needs to provide an approved French-language User Interface (UI). Therefore, according to this policy, the system's program instances must belong to the type class Français. Programs meeting the French-language UI requirement may then be defined as belonging to the set Français. One way that this may be defined, for example, is as follows:

```
data System
  = forall p1 p2 p3 p4.
    (Français p1, Français p2, Français p3, Français p4)
    => System p1 p2 p3 p4
```

In this example, the system can contain programs p1-p4, but only if each belongs to the Français type class.

A similar policy may be that the French UI must be a "good" French UI, according to some general criteria. The program instances meeting the "good" French UI requirement may be then defined as belonging to Français. For instance, if program p1 meets this requirement it may be defined as: instance Français p1.

According to one embodiment, a predefined person determines what program would satisfy requirements that cannot be determined mechanically and automatically, such as the "good" requirement in the example above. According to one embodiment, a local system administrator determines the program instances that meet the specified requirement. The administrator may choose to defer to some other person or entity, such as the program's publisher when appropriate, or to other authorities. The Binder security language may be used to provide mechanisms for attribution and deferral ("delegation") in a distributed environment to assist in this process.

Another system policy may relate to the security of a program. For example, if a program is known to be insecure it may not be allowed. Alternatively, a program may not be allowed if it is not known to be secure. The system policy may change over time thereby making a valid system instance on day 1 invalid on day 2. For instance, ongoing security alerts that are received by the system may cause the checker to reject a system instance as no longer meeting its policy. As can be seen, many types of policies may be developed and it is left to the individual situation to establish the policies for the system instances that are to be allowed.

The system policies may be created by a variety of users, including system administrators, program developers, users, third parties and the like. System policies may also be imported from data stores and from across a network. For example, a company may store system policies that relate to specific programs and computing devices at their support site. A system administrator may then choose to adopt any of these policies in whole or in part, referring to them from the local system policies.

Figure 3:
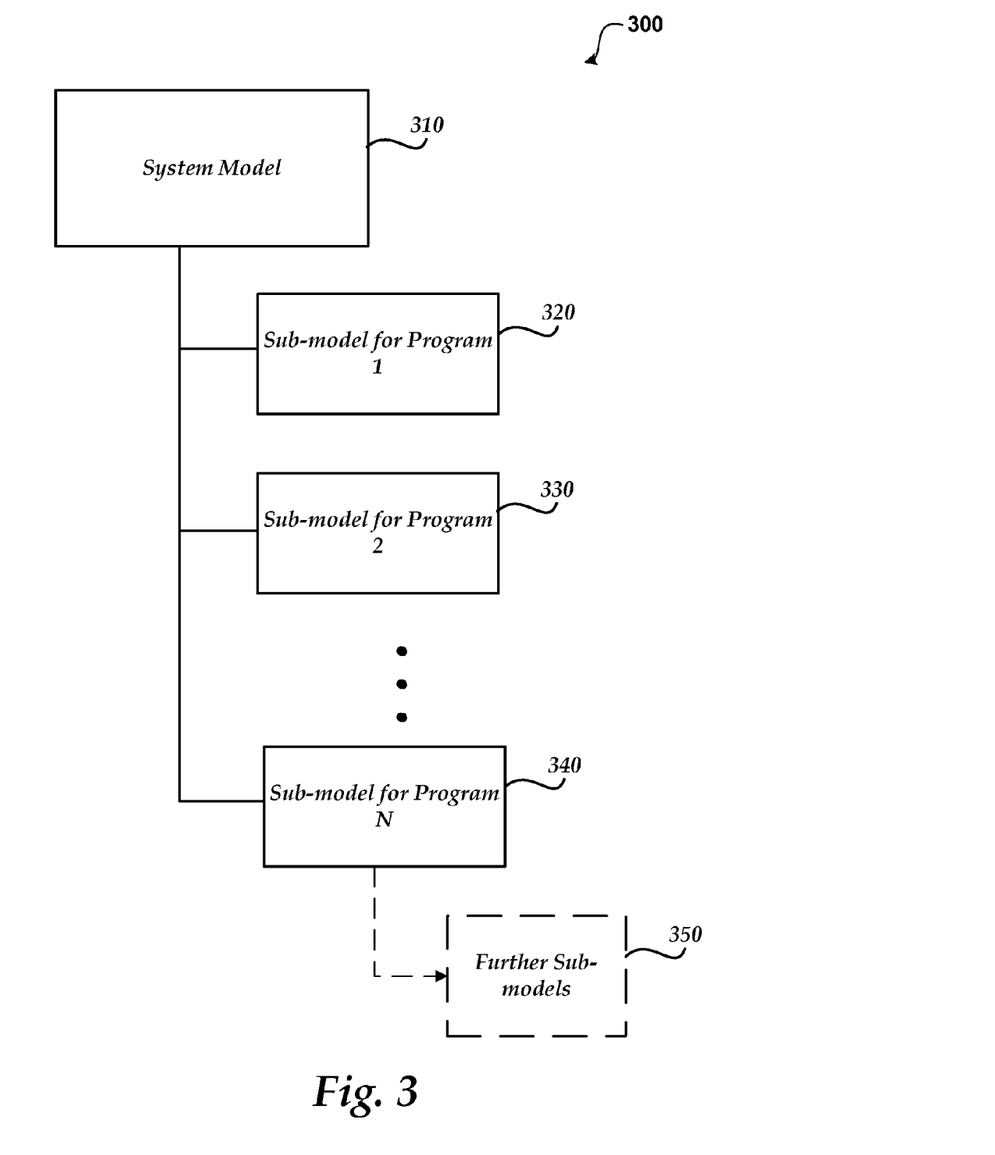
FIG. 3 illustrates a hierarchical system model.

FIG. 3 illustrates a hierarchical system model, in accordance with aspects of the invention. A system model may reference and incorporate any number of sub-models. These sub-models may also be hierarchical, incorporating further sub-models. Generally, each program within the system can have an associated sub-model, with the system model declaring how the programs will interconnect and interoperate. Programmers, publishers, and remote administrators can write these sub-models, while the local administrator may incorporate them into the local system model. The system models and sub-models are created such that they express rules for how the various programs may be correctly combined into a system. As illustrated, system model 310 includes sub-model 1 (320), sub-model 2 (330) and sub-model N (340) which includes its own sub-models (350).

Figure 4:
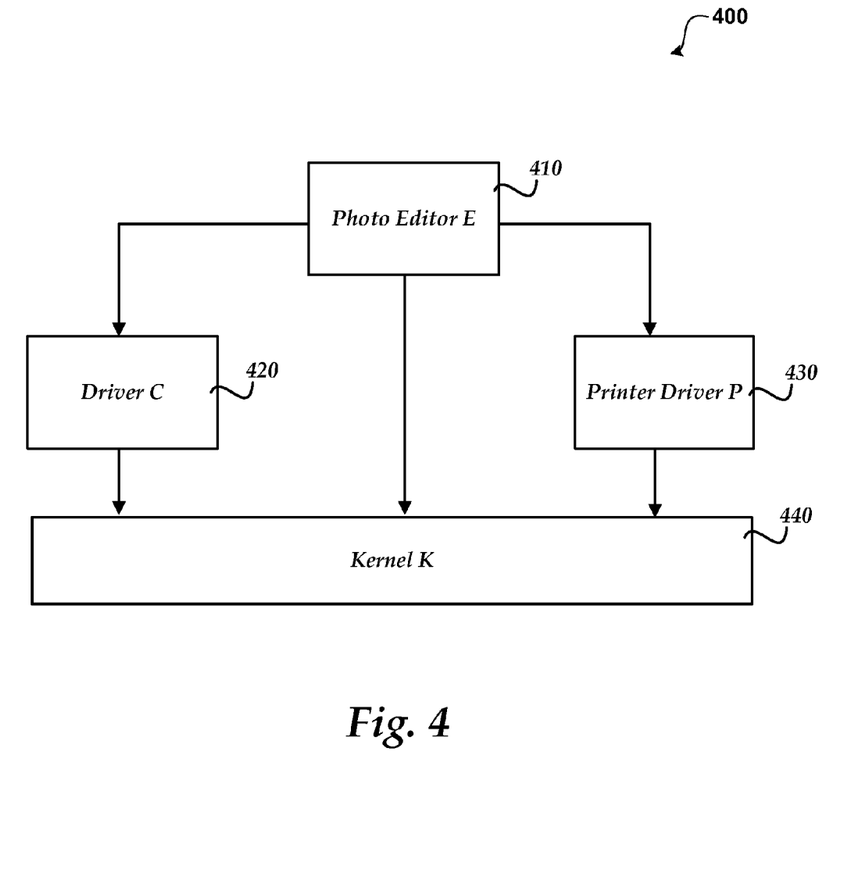
FIG. 4 shows a system configuration example.

FIG. 4 shows a system configuration example, in accordance with aspects of the invention. In the example illustrated in FIG. 4, the system model representing system 400 incorporates sub-models for photo editor E (410), driver C (420), printer driver P (430) and kernel K (440), and specifies their interconnection and interoperation.

Programs models are parameterized so that they may be applied in a variety of circumstances. Each program model is applied to its appropriate parameters, as derived from the system parameters, to yield a configured program instance, and then the program instances are composed into a fully configured system instance. Although the examples presented herein utilize the well-known functional language Haskell, other functional or semi-functional programming languages may be used. Applying each of the programs (k, c, p and e) produces instances k, c, p, e.

k=kModel ( )
c=cModel k
p=pModel True k
e=eModel True k c p
system=systemModel k c p e In the example above, pModel and eModel each take a Boolean parameter. The resulting value system is the fully configured system instance, incorporating k, c, p, and e.

The system model systemModel is a parameterized function that takes the four program instances and returns a system instance.

systemModel k c p e=System bind [k, c, p, e])

In this example, the function "bind" links a number of programs and returns the result.

When using traditional imperative system configuration instead of the declarative system configuration of this invention, many things can go wrong when programs are configured into a system. For example some of the programs may simply not work together. Printer driver P may require a formatting language that photo editor E cannot produce, or produces incorrectly. If there are multiple versions of P and E, the user can choose a bad pair. The user can also improperly configure the programs, causing them not to work together. For example, improperly configuring the UTF-8 support in kernel K could cause some or all of the programs to not work properly.

In traditional systems, the system configuration exists as mutable state in the file system, in a registry, and the like. Additionally, the configuration of the system updates the current system instance when a modification, such as installing and uninstalling programs, takes place. A system's correctness therefore depends on the correctness and the appropriateness of each install and uninstall the system has ever performed, as well as the appropriateness and the precise order of these operations. As the system changes over time, even an initially good system can become improperly configured. Since many configuration settings are shared or global, local updates to one component or setting can easily create problems on systems elsewhere.

Using declarative system configuration, each system instance is computed separately, and does not depend on earlier system instances. Not only are the system instances computed as simple values, they may also be statically typed and statically checkable. The models are also statically checkable.

According to the present example, a system instance of type System must contain a kernel instance of some specified type, and a system instance computation will not type-check if another type is used. These definitions may be modified according to the requirements of the system. These definitions may in particular utilize subtyping in order to state the weakest conditions for a kernel instance for this system instance.

Whenever a system instance boots, the checker (as illustrated in FIG. 2) may check to determine if it is a correct system instance and refuse to boot the system instance if it is not. This provides an end-to-end check that is absent in imperative system configuration, in which systems typically boot whatever system instance they find on the disk or on the network.

Figure 5:
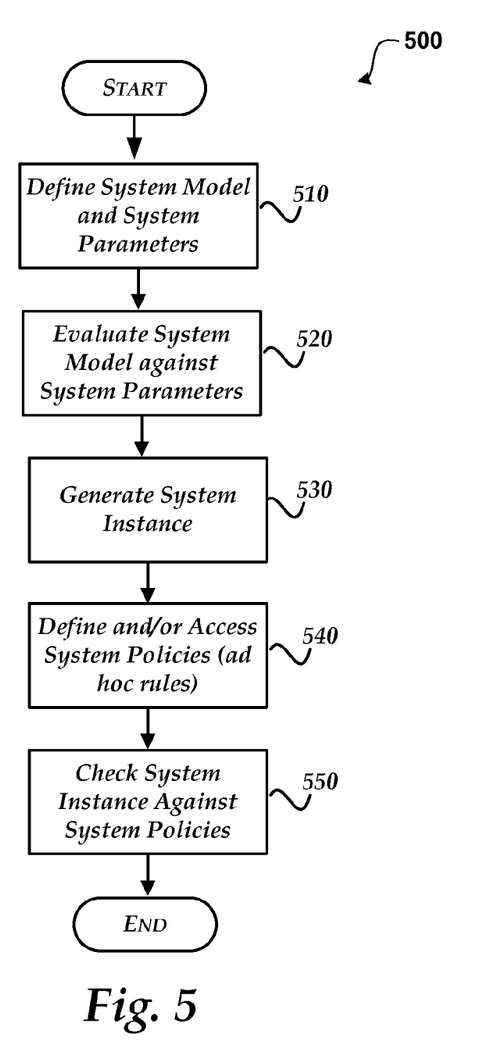
FIG. 5 shows a process for creating and initiating a system instance.
Figure 6:
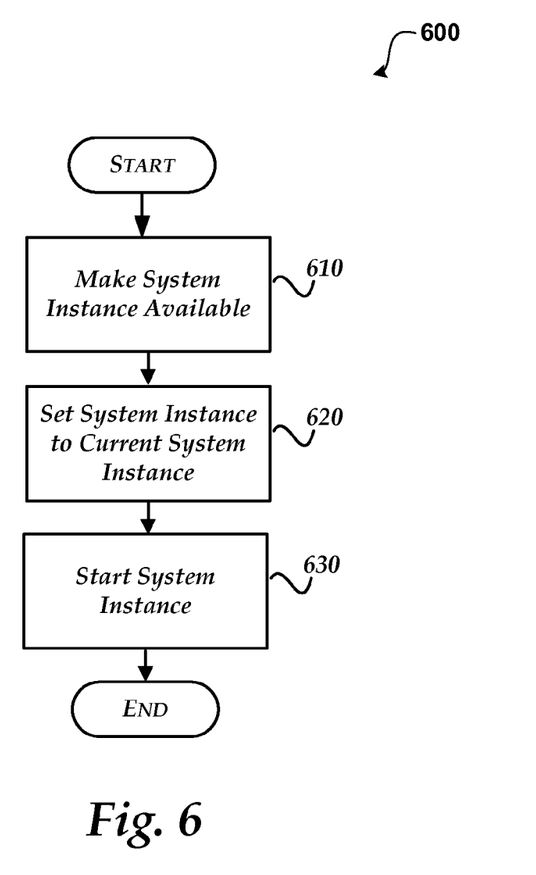
FIG. 6 illustrates a process for installing a system instance, in accordance with aspects of the present invention.

Referring now to FIGS. 5 and 6, illustrative processes for operating with declarative system configurations will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements and other requirements of the computing system implementing the invention. Accordingly, the logical operations illustrated and making up the embodiments of the described herein are referred to variously as operations, structural devices, acts or modules. These operations, structural devices, acts and modules may be implemented in software, in firmware, in special purpose digital logic, and any combination thereof.

FIG. 5 shows a process 500 for creating and initiating a system instance, in accordance with aspects of the invention. After a start operation, the process moves to operation 510 where a system model is defined along with the system parameters. As described above, the system model may incorporate one or more sub-models that are used to define the programs within a system.

Moving to operation 520, the system model is evaluated against the system parameters.

Moving to operation 530, the process generates a system instance in response to the evaluation. The system instance is a complete representation of the system as defined by the system model as applied to the system parameters. According to one embodiment, the system instance is immutable. As described above, other system instances may be stored within the system, and one or more can be set to be the current system instance.

Transitioning to operation 540, system policies may be defined and/or accessed. System policies may be defined locally or globally, and at any point in time. Typically, system policies are defined after the program has been distributed for use. Some of the system policies may be defined before the system instance is generated whereas further system policy rules may be defined after the system instance is generated. These system policies may be stored and indexed within a data store such that they may be accessed.

Flowing to operation 550, the system instance may be checked against the defined system policies. The system instance may be checked against the system policies at a variety of times. For example, a system instance may be checked a single time or one or more times as the system instance is running. For example, a system instance may be checked against the system parameters both at the initial boot up as well as dynamically, such as when programs are dynamically loaded, or when new information becomes available regarding the components of the system policy.

The process then moves to the end, and the process returns to processing other actions.

FIG. 6 illustrates a process for installing a new system instance, in accordance with aspects of the invention. After a start operation the process flows to operation 610 where the new system instance is made available. The system instance may be available to a single machine, such as a local machine or the system instance may be made available to many different machines, such as machines across the network.

Moving to operation 620, the system instance is set to be the current system instance. According to one embodiment, the system instance is set to the current system instance by setting the local machine to boot only from the new system instance, as specified by the system instance's secure hash.

Transitioning to operation 630, the machine receiving the new system instance is started with the new system instance. According to one embodiment, the machine is rebooted. Since the creation and the installation of a system instance follow an all-at-once approach, the order in which system instances are produced and installed does not matter, and therefore, the sequence of installs and uninstalls can not result in a badly formed system instance.

As described previously, as part of the operation of booting a system instance, the machine can check that the instance is the current system instance, and refuse to proceed if it is not.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for configuring a system, comprising:
    declaring a system model; wherein the system model specifies a system that describes each of the programs that are used within a configured system;
    setting system parameters; wherein the system model and the system parameters may be established differently for other systems;
    evaluating the system model based on the system parameters; and
    after evaluating the system model creating a system instance based on the evaluation that is unchangeable once created and is used as a current system instance that is used in starting and running on the system until the current system instance is replaced with a different system instance.

2. The method of claim 1, further comprising checking the system instance against system policies.

3. The method of claim 1, wherein the system instance is created from mutable and immutable elements; wherein the mutable elements are segregated from the immutable elements.

4. The method of claim 1, wherein declaring the system model comprises incorporating a sub-model for each program within the system wherein incorporating the sub-model for each program within the system comprises creating a program instance for each sub-model; wherein the program instance may share storage space with other program instances.

5. The method of claim 4, wherein the system instance may export a number of values and each program instance may export a number of values.

6. The method of claim 4, wherein evaluating the model comprises applying the model to the system parameters, wherein the model is represented by a function and wherein applying the same model to the same system parameters always creates the same system instance.

7. The method of claim 2, wherein checking the system instance against the system policies comprises checking ad hoc rules that constrain an acceptable structure of the system; wherein the ad hoc rules may be established differently for each local system.

8. The method of claim 7, wherein the ad hoc rules may be changed after the system instance has been created.

9. A computer-readable medium having computer-executable instructions encoded on a memory device for configuring a system, comprising:
    defining a hierarchical system model that comprises sub-models and wherein the hierarchical system model precisely specifies the system as a whole;
    evaluating the hierarchical system model against system parameters;
    after evaluating the system model creating a system instance based on the evaluation; and
    checking the system instance against system policies; wherein the system instance is unchangeable once created and wherein the system instance is used as a current system instance that is used in starting and running the system until the current system instance is replaced with a different system instance.

10. The computer-readable medium of claim 9, further comprising installing the system instance on a computing device.

11. The computer-readable medium of claim 10 wherein installing the system instance on the computing device comprises setting the computing device to boot from the system instance, wherein the system instance is identified by at least one of: a secure hash and an arbitrary predicate that may depend upon attestation in the form of signed statement; and booting the computing device.

12. The computer-readable medium of claim 10, further comprising determining if the system instance is a current system instance and when it is not refusing to boot the system instance.

13. The computer-readable medium of claim 11, wherein checking the system instance against the system policies comprises performing the checking dynamically.

14. The computer-readable medium of claim 13, wherein the system polices are ad hoc rules that set constraints on at least one of a kernel and a program; and wherein failure to meet new ad hoc rules that are different from the ad hoc rules for the system instance may result in at least one of the creation and installation of a new system instance that meets the new ad hoc rules.

15. A system for configuring a system, comprising:
a processor and a computer-readable storage medium;
a system model that defines a system and may include a sub-model for each program within the system;
an evaluator that executes on the processor and that is configured to produce a system instance based on an evaluation of the system model and related system parameters; wherein the system instance is unchangeable once created and wherein the system instance is used as a current system instance that is used in starting and running the system until the current system instance is replaced with a different system instance; and
a checker that is configured to check the system instance against established system policies.

16. The system of claim 15, further comprising an installer that is configured to install the system instance.

17. The system of claim 16, wherein the system instance may be installed without modification on a number of computing devices.

18. The system of claim 16, wherein each of the sub-models is represented by a program instance that may be identified by at least one of a hash and a predicate that may depend upon an attestation in the form of signed statements.

19. The system of claim 18, wherein the system instance is statically typed and statically checkable.

20. The system of claim 18, wherein the system policies are implemented using type rules.

* * * * *